United States Patent [19]

Hampton

[11] Patent Number: 4,754,727

[45] Date of Patent: Jul. 5, 1988

[54] DEVICE FOR VARYING ENGINE VALVE TIMING

[75] Inventor: Keith Hampton, Ann Arbor, Mich.

[73] Assignee: Eaton Corporation, Cleveland, Ohio

[21] Appl. No.: 73,598

[22] Filed: Jul. 13, 1987

Related U.S. Application Data

[63] Continuation-in-part of Ser. No. 939,587, Dec. 9, 1986.

[51] Int. Cl.[4] .............................................. F01L 1/34
[52] U.S. Cl. .............................. 123/90.15; 123/90.17; 123/90.31
[58] Field of Search ................ 123/90.15, 90.17, 90.31

[56] References Cited

U.S. PATENT DOCUMENTS

| | | | |
|---|---|---|---|
| 3,827,413 | 8/1974 | Mecham | 123/90.15 X |
| 4,091,776 | 5/1978 | Clemens et al. | 123/90.15 |
| 4,305,352 | 12/1981 | Oshima et al. | 123/90.31 X |
| 4,545,338 | 10/1985 | Alfred, III | 123/90.15 |
| 4,708,101 | 11/1987 | Hara et al. | 123/90.17 X |

Primary Examiner—Ira S. Lazarus
Assistant Examiner—Peggy Neils
Attorney, Agent, or Firm—C. J. Toddy

[57] ABSTRACT

A device for angularly displacing a camshaft relative to the crankshaft of an internal combustion engine to vary engine valve timing. The device comprises a hub fixed to the camshaft, an annular means threadedly engaged with the hub or with an advancing member mounted on the outer surface of the annular means. Angled lugs formed on a drive member coact with angled slots formed on the outer periphery of the advancing member. The amount of angular displacement of the drive member relative to the hub and camshaft is directly proportional to the axial displacement of the advancing member which in turn is moved axially as the annular means is moved axially along the threads on the hub or on the advancing member. The latter movement is effected by applying a retarding or braking torque to the annular means.

23 Claims, 5 Drawing Sheets

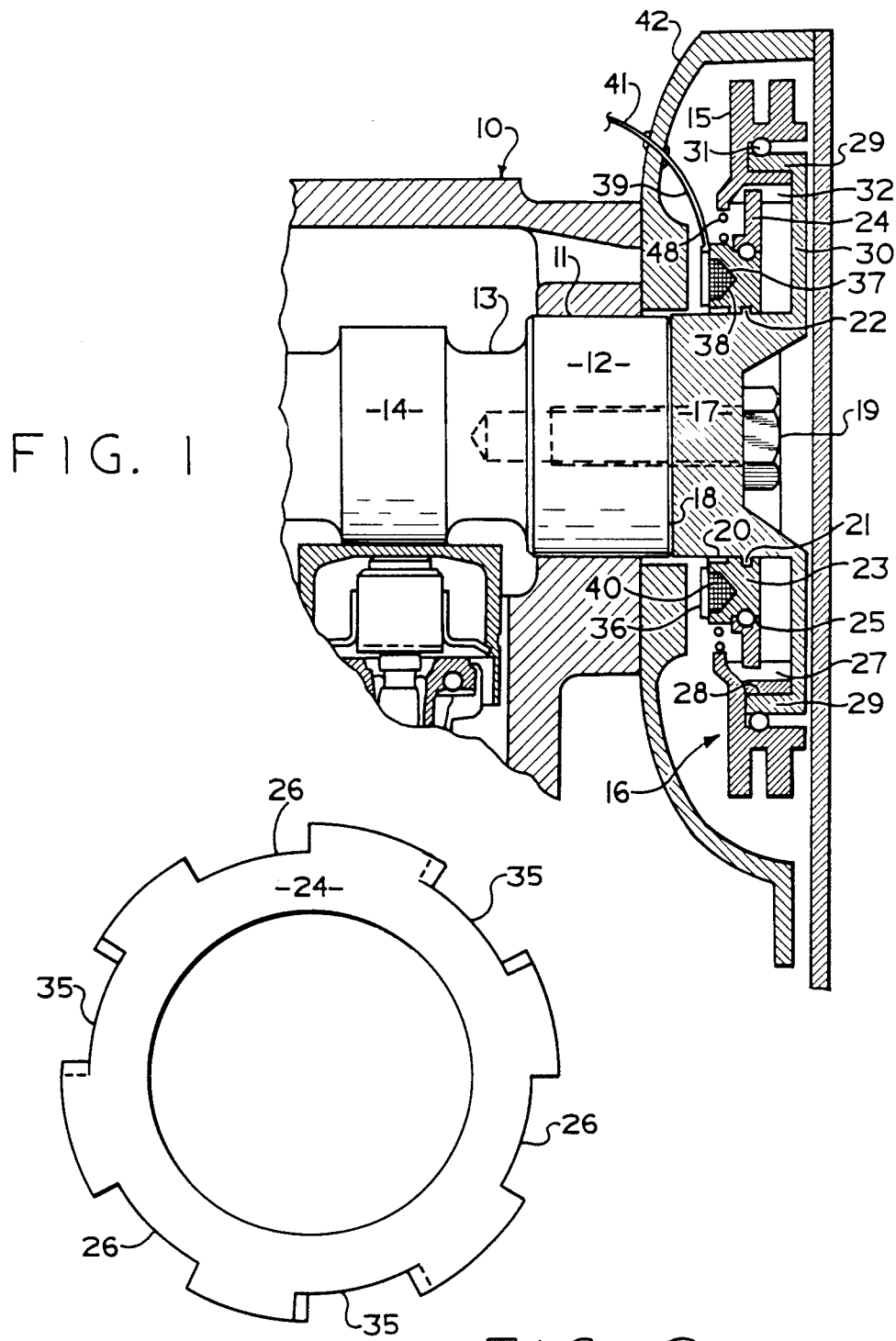

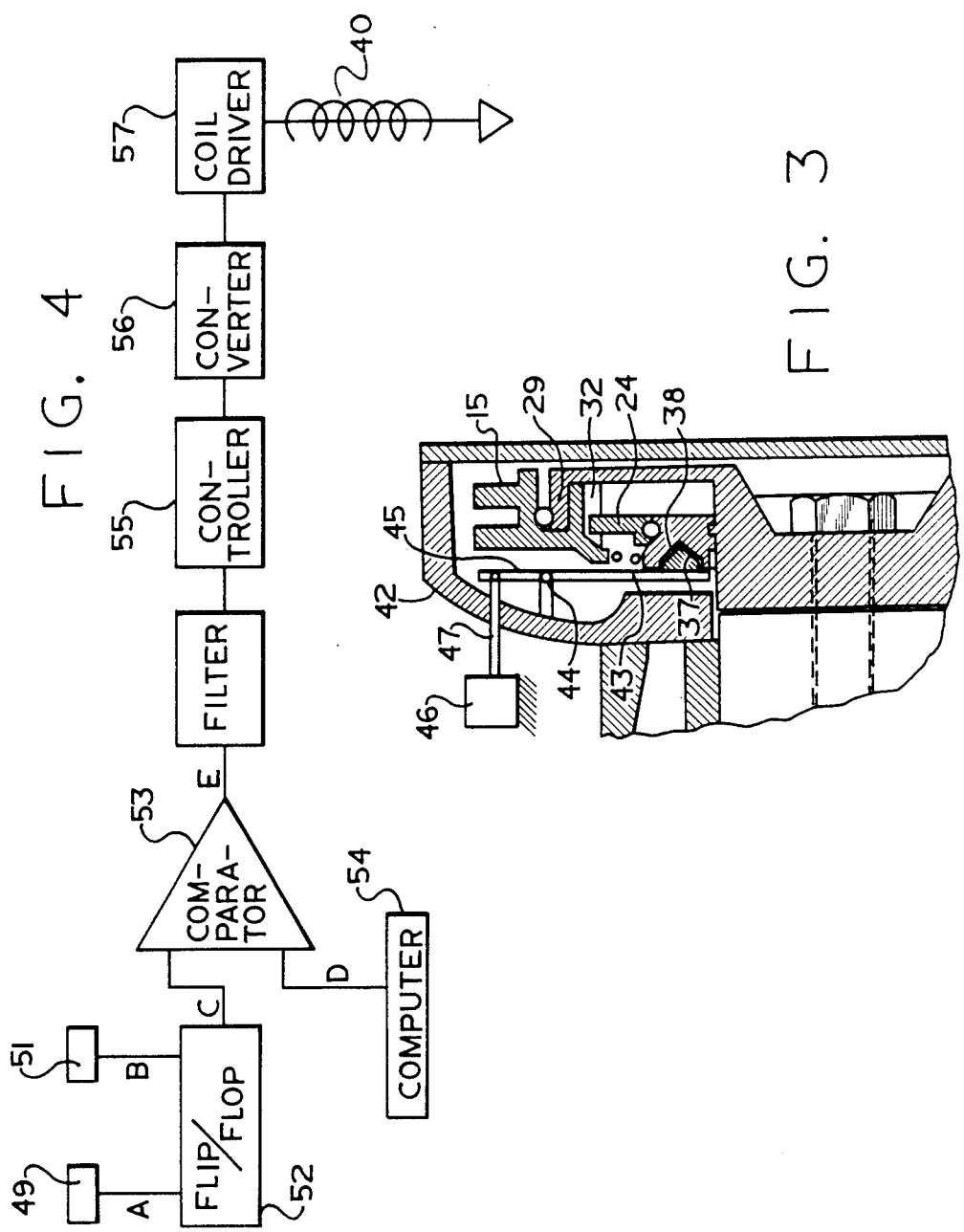

DEVICE FOR VARYING ENGINE VALVE TIMING

This is a continuation-in-part of application Ser. No. 939,587, pending filed Dec. 9, 1986.

This invention relates to a device for varying the angular displacement of a camshaft relative to the crankshaft of an internal combustion (IC) engine to vary engine valve timing. More particularly, the invention relates to such a device which is infinitely variable between limits and enables angular displacement of the camshaft relative to the crankshaft to any predetermined number of degrees within the operating range.

In general, the camshafts of IC engines are coupled to the crankshaft by a toothed belt or a chain and thus driven syncronously with the crankshaft. As a result the valve opening and closing phases as well as the overlap angle are constant. As is known, the optimum timing of these phases changes depending on engine speed, load, torque, etc.

U.S. Pat. No. 3,626,720 Meachems et al. discloses a mechanism including a helical ball spline for varying the phase relationship between a camshaft and crankshaft which is controlled by a piston valve.

U.S. Pat. No. 4,302,985 Natkin discloses a similar mechanism including a helical groove and tracking post for varying the phase relationship controlled by a spring.

U.S. Pat. No. 4,305,352 Oshima, et al. shows a camshaft control including a plantary gear train controlled by a worm gear and U.S. Pat. No. 4,481,912 discloses a similar mechanism having helical guides controlled by external electric motors.

U.S. Pat. 4,535,731 Banfi discloses a device for varying camshaft timing hydraulically actuated and controlled by a slide valve actuated by an electromagnet.

These known devices controlled by external motors or by piston or slide valves are not suitable because of their control limitations or because of their bulk and arrangement of parts.

An object of this invention is an improved engine valve timing device mounted on the end of an engine camshaft which is infinitely variable, is compact and fits within the space limitation of the engine compartments of modern cars particularly transverse mounted engines.

Another object of this invention is an improved infinitely variable valve timing device which precisely adjusts the valve timing by adjusting the angular displacement of the camshift relative to the crankshaft of an IC engine by a predetermined number of degrees in which an angular adjustment is initiated by actuating a non-rotatable retarder to apply a retarding torque to the advancing mechanism.

Other objects and advantages will be apparent from the following description taken in connection with the accompanying drawings, in which:

FIG. 1 is a partial longitudinal cross sectional view of one embodiment of the present invention with parts broken away and in cross section.

FIGS. 2, 2a and 2b are plan views respectively of the advancing member, hub and sprocket member.

FIG. 3 is a view similar to FIG. 1 of another embodiment of the invention.

FIG. 4 is a block diagram of an electrical control circuit which may be incorporated into the embodiment of the present invention shown in FIG. 1.

Figure 2A:
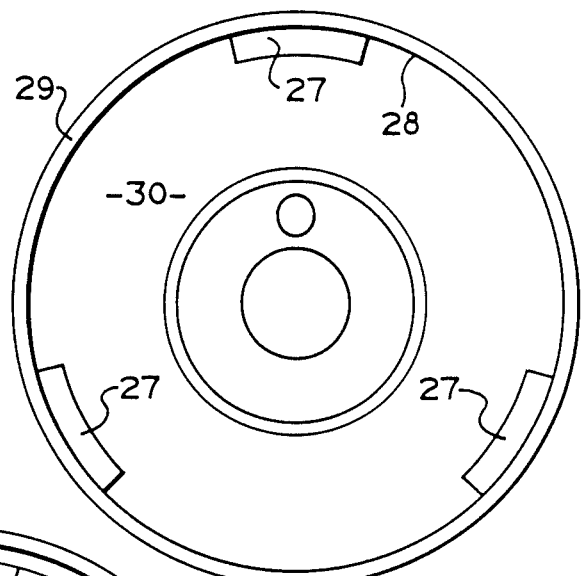

In FIG. 1, a fragment of the cylinder head 10 of an internal combustion (IC) engine is shown. The cylinder head 10 includes bearings 11 which support journals 12 of the camshaft 13. The camshaft 13 is provided with cams 14 which actuate intake or exhaust valves through which fuel and air access the engine cylinders and exhaust gases egress. Camshaft 13 is driven synchronously with the crankshaft via a cogged belt or chain in driving relationship with a sprocket member 15 attached to the end of the camshaft.

In accordance with this invention, the valve timing device 16 has a hub 17 suitably attached to the end 18 of camshaft 13 by a fastener 19 threaded into a hole machined into the end of the camshaft 13, so that the hub 17 is fixed to and rotates with the camshaft 13. A cylindrical portion 20 of the hub 17 is provided with a coarse male thread 21 having a pitch of approximately one half inch. The thread 21 meshes with and is treadedly engaged by a corresponding female thread 22 provided on the ID of an annular advancing ring 23. Thus, relative rotation between the hub 17 and the ring 23 of one revolution causes the ring 23 to move axially on the hub approximately one half inch. An annular advancing member 24 is rotatably mounted on the outer surface 25 of the advancing ring 23 on a suitable bearing to permit relative rotation but no axial movement between the ring 23 and the annular advancing member 24.

Figure 2B:
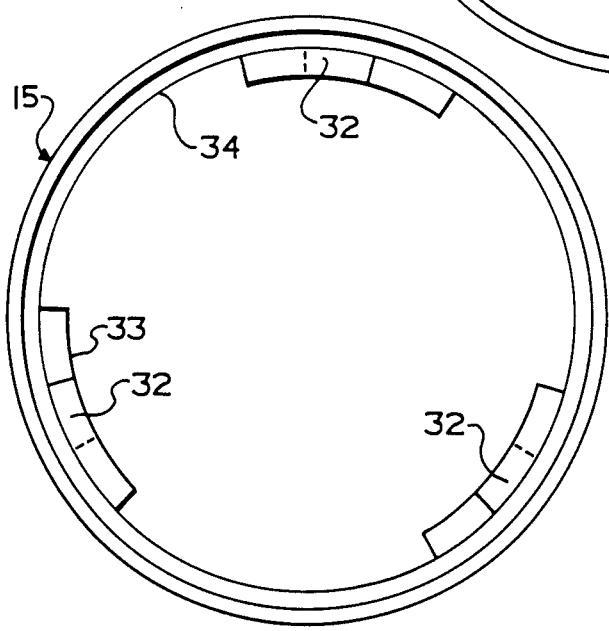
Figure 5:
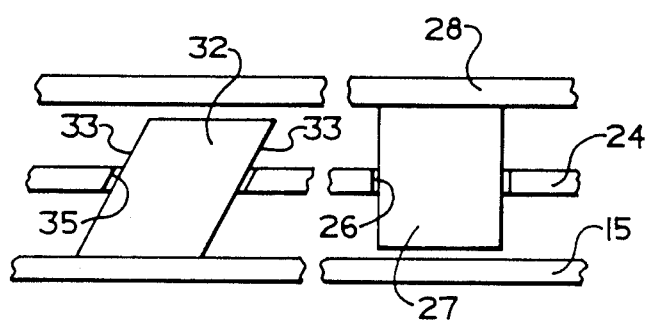
FIG. 5 is a side view with parts broken away and in cross section of the advancing member, hub and sprocket member.

As shown in FIG. 2, the annular advancing member 24 is provided with a plurality of straight axially extending slots 26 at its outer periphery which coact with straight axially extending lugs 27 formed on the radially inner surface 28 of the flange 29 which extend axially from the radial portion 30 of the hub. Coaction of the lugs 27 with the slots 26 prevents the annular advancing member 24 from rotating relative to the hub 17, but permits axial movement relative to the hub 17.

The drive or sprocket member 15 is mounted on a suitable bearing 31 formed between the sprocket and the flange 29 so that the sprocket member 15 may rotate relative to the hub member 17. The hub 17 is provided with lugs 32 having side walls 33 extending axially at an angle and equally spaced on the radial inner wall 34 of the sprocket member 15. The angled side walls 33 of lugs 32 coact with corresponding angled slots 35 formed in the outer periphery of the advancing member 24. Slots 35 are equally spaced apart and are offset peripherially of the straight slots 26 in the advancing member 24. Thus, as the annual advancing member 24 is moved axially, the angled slots 35 thereof coact with the angled lugs 32 of the sprocket member 15 causing the sprocket member 15 to rotate relative to the hub 17.

From the foregoing, it is seen that the amount of angular displacement of the sprocket member 15 relative to the hub 17 and camshaft 13 is directly proportional to the axial displacement of the advancing member 24 which in turn is moved axially as the advancing ring 23 is moved axially along the threads 21 and 22. The latter movement is effected by applying a retarding or braking torque to the advancing ring 23. When the engine is operating, the advancing ring 23 rotates with the hub 15 and crankshaft 13 as a unit. By applying a retarding force to the ring 23, the rotation of the ring is slowed or retarded slightly so that the slightly faster rotation of the hub causes the ring to move along the threads 21 and 22.

The retarding or braking torque is applied to the ring 23 by an annular retarder 36 mounted on the cylindrical portion 20 of the hub 17 adjacent to the ring 23. The retarder 36 has annular angled working surfaces 37 which extend into but in spaced relationship with angled annular working surfaces 38 formed in the advancing ring 23. The retarder 36 is preferably provided with a flexible radially extending tab member 39 suitably secured to the head 10. The tab member 39 is flexible and thus permits limited axially movement of the retarder 36, but prevents the retarder 36 from rotating.

The retarder 33 may be actuated mechanically, hydraulically or electrically to move axially and cause the surfaces 37 and 38 to frictionally engage or to move close enough together to cause a viscous shear of the engine oil pumped by the oil pump from the cam journal 12 to the angled surfaces 37 and 38. Preferably, the retarder is actuated electrically by a coil 40 which when energized acts as an electromagnet that is attracted by magnetic forces toward the advancing ring 23 to lessen the clearance or distance between the surfaces 37 and 38 and increase the viscous shear of oil between those surfaces and thus applies a retarding torque to the ring 23. Electric wire 41 are embedded or fixed to the tab member 39 and connected to coil 40. The wires 41 are coextensive with the tab 39 and extend through the chain cover 42 to a controller, not shown, through which an electric current passes to energize the coil 40.

Instead of relying on viscous shear of oil existing between the surfaces 37 and 38, the retarding torque may be applied to the ring 23 via mechanical friction. For example, one of the working surfaces 37 or 38 may be provided with a layer of friction brake material and the retarder mechanically moved axially so that the surfaces 37 and 38 engage to produce a retarding torque and thereby retard the rotation of the ring 23 relative to the hub 17 and cause the ring 23 to move axially along the threads 21.

Furthermore, instead of relying on magnetic forces of the coil 40 to move the retarder 37 toward ring surfaces 38, a yoke 43, or other linkage, may be connected to the retarder 36 and actuated by suitable means located externally of the cover 42, as shown in FIG. 3. The yoke 43 may be pivoted at 44 with the yoke arm 45 extending radially from the pivot 44. A suitable hydraulic, or mechanical actuator 46, located externally of the cover 42, may be used to actuate a link 47 connected to the arm 45 which extends through the cover 42 to the actuator 46.

A reversing spring 48 has one end fixed to the chain sprocket 15 and the other end fixed to the hub 17 to return the sprocket 15. The spring 48 thus applies a torque to the chain sprocket 15 opposite in direction to the torque applied by the retarder 36 but of a magnitude less than the retarding torque. The reversing spring 48 functions to return the retarder 36 and the sprocket 15 to a zero advance or a null position.

Figure 6:
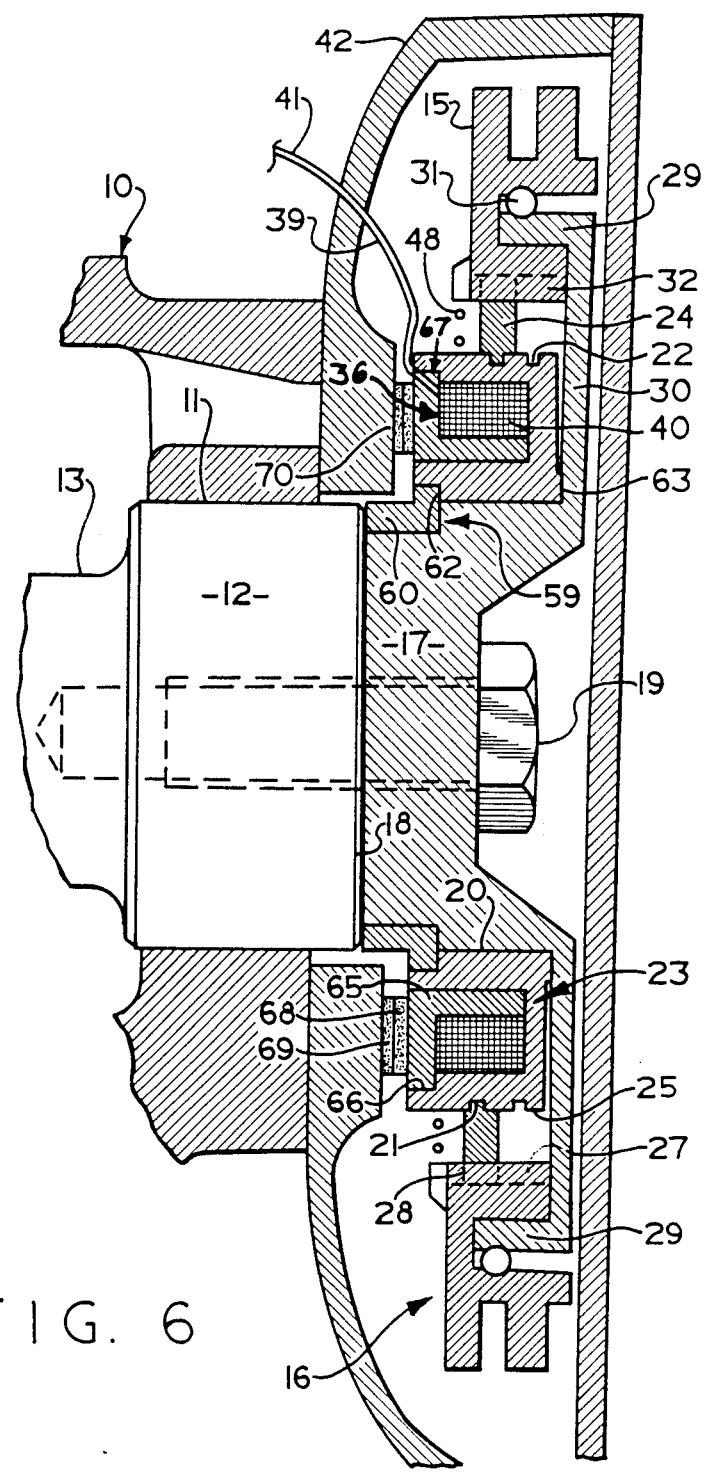
FIG. 6 is a view similar to FIG. 1 of a preferred embodiment of the invention.
Figure 7:
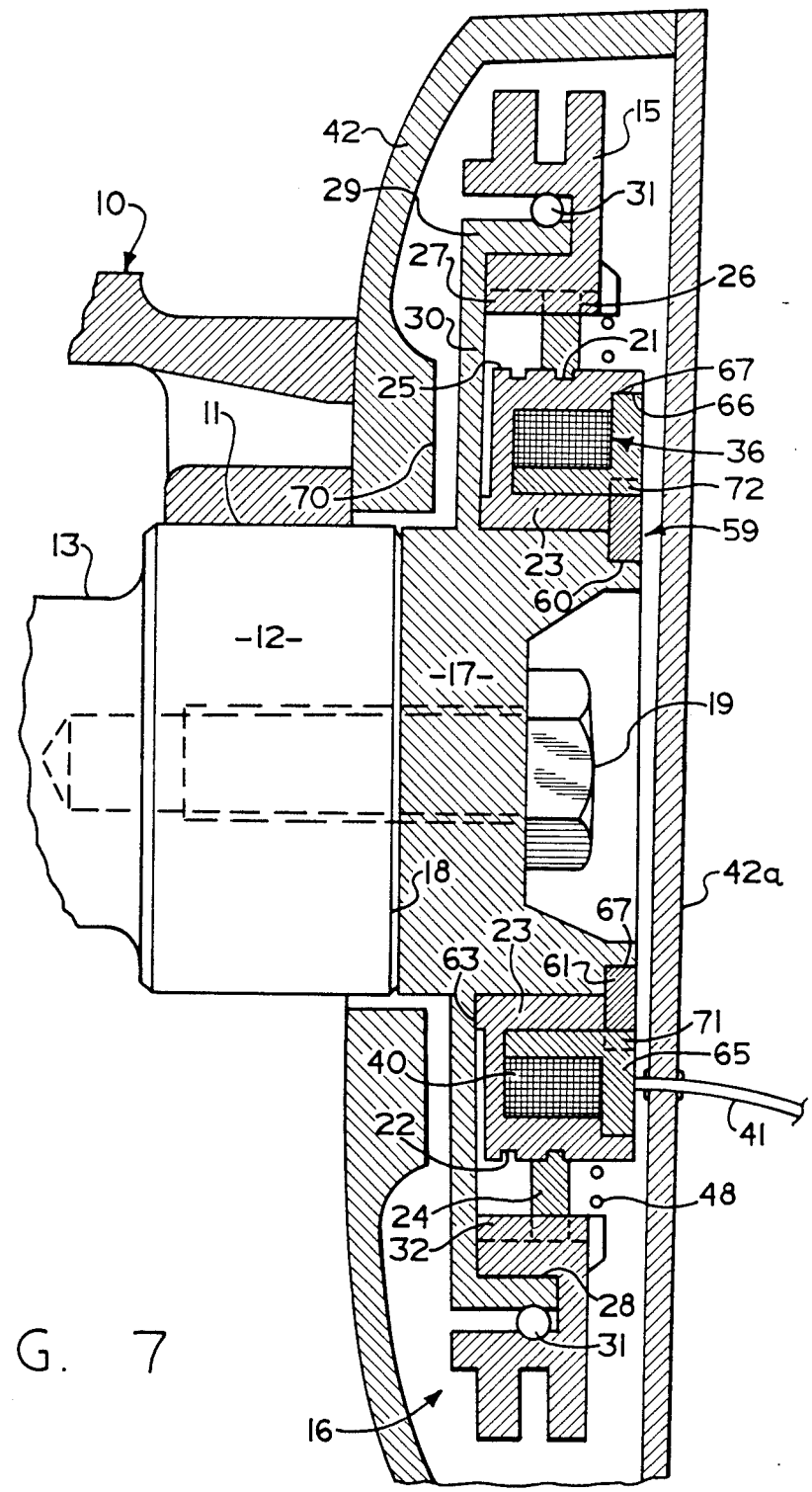
FIG. 7 is a view similar to FIG. 6 of a preferred embodiment of the invention.

Other embodiments of the invention are shown in FIGS. 6 and 7 in which parts like those shown in FIGS. 1 through 5 are identified with the same numerals.

In FIG. 6, the meshing threads 21 and 22 are formed respectively on the ID of the advancing member 24 and the OD of the member 23. The member 23 is annular and generally U-shaped in cross-section, and includes an outer cylindrical surface 25 in which the female threads 22 are formed. Thus, the female threads 22 mate with the male threads 21 formed on the radially inner surface of the annular advancing member 24. The periphery of the advancing member 24 of FIG. 6 is provided with straight slots 26 and angled slots 35 as shown in FIG. 2. Slots 26, of course, mesh with the straight lugs 27 formed on the inner surface 28 of the flange 29. In a like manner the angled lugs 32 mate with the angled slots 35 of the member 24. Axially movement of the advancing member 24 is thus converted into limited relative angular movement of the sprocket member 15 to the flange 29 of the hub as previously described above.

The U-shaped member 23 shown in FIG. 6 is prevented from moving axially of the hub by a keeper 59 which is press fitted to the hub at 60. The keeper 59 is provided with an annular flange 61 fitted into an annular shoulder 62.

At the opposite end of the member 23, an annular shoulder 63 is provided which bears against the radial portion 30 of the hub. Sufficient clearance exists between the keeper 59 and the shoulder 62 as well as between the shoulder 63 and the portion 30 so that the member 23 may be rotated relative to the hub but is prevented from axial movement.

As shown in FIG. 6, the retarder 36 comprises a retarder coil 40 and an armature 65 which is L-shaped in cross-section. The retarder 36 is positioned in the annular cavity of the U-shaped member 23 with the outer periphery 66 of the armature 65 extending into an annular notch 67 formed of the member 23. The retarder 36 is secured to the chain cover 42 by a pair of Velcro pads 68 and 69. Both of the pads 68 and 69 are circular in shape with the pad 68 adhered to the armature 65 and the pad 69 adhered to the adjacent portion 70 of the chain cover 42. Other suitable means for securing the retarder 36 from rotating relative to the member 23 may be used. Of course, electric wires 41 are connected to the coil 40 and extend through the housing 42 and electrically connected to the coil driver 58 shown in FIG. 4.

In the preferred embodiment of the invention, shown in FIG. 7, the timing device 16 is reversed so that the radial portion 30 of the hub 17 is located adjacent the portion 70 of the chain cover and between the portion 70 and the retarder 36. Thus, the armature 65 and the keeper 59 are adjacent to the end cover 42a rather than adjacent the portion 70 of the chain cover. Electric wires 41 are connected to the coil 40 and extend through the end cover 42a and are electrically connected to the coil driver 58 shown in FIG. 4. In the embodiment of the invention shown in FIG. 7, the retarder 36 is prevented from rotating relative to the member 23 by the wires 41 and prevented from axial movement by providing the keeper 59 with an annular extention 71 on the radially outer periphery of the keeper 59. The extention 71 projects into a corresponding annular shoulder 72 formed in the radially inner surface of the armature 65. The U-shaped member 23 is prevented from moving axially by the keeper 59 which is press fitted into the hub at 60 but the member 23 is free to rotate due to clearances between the keeper 59 and the member 23 and between the shoulder 63 and the portion 30. Of course, other suitable means such as flexible fasteners extending through the end cover 42A and projecting into the armature 65 may be used for securing the retarder 36 from rotating relative to the member 23.

Assuming the engine is operating, the member 23 rotates with the sprocket member 15, the hub 17 and the cam shaft 13 as a unit. Upon energization of the retarder coil 40 shown in FIGS. 6 and 7, electromagnetical forces are generated between the retarder and the member 23 which produces retardation of the member 23 so that the rotation of the member 23 is slowed or retarded slightly and the slightly faster rotation of the hub causes the annular advancing member 24 to move along the threads 21 and 22. The axially movement of the advancing member 24 in turn causes sprocket member 15 to rotate relative to the hub 17.

A block diagram of a closed feedback loop control circuit is shown in FIG. 4 for controlling the energization of the retarder coil 40 to effect the desired amount of advance or angular position of the sprocket member 15 relative to the camshaft 13. A first electromagnetic sensor 49 is mounted on the non-rotating advancing ring 23 in a position to detect a bump or other physical discontinuity on the advancing ring 23. As previously stated, the advancing ring 23 rotates approximately ¾ of a turn in moving from zero advance to full advance, thus causing about 270 degrees of phase shift in the signal A generated by the sensor 49. A second electromagnetic sensor 50 is mounted on the chain cover 42, or other location, in a position to detect a bump or other physical discontinuity on the hub 17 and generates a signal B. The signals A and B from sensors 49 and 50 are fed to a R-S flip-flop device 52 generating an output signal C which is fed to a comparator 53, together with a signal D, representing the desired advance signal, generated by the engine computer 54. Of course, the signal B may be generated by the engine computer 54, instead of by a sensor 56. The comparator 53 generates an error signal E which is fed to filter 55 and filtered to d.c., fed to PID controller 56 and hence to a converter 57. The output signal of the converter 57 drives a coil driver 58 connected to the coil 40. The pulse width signal C is indicative of the actual position of the advancing ring 23 and the actual number of degrees between the angular positions of the camshaft 13 and the sprocket 15. Thus, the pulse width error signal E is indicative of the difference in the actual position of the ring 33 and the desired position and hence the output of the coil driver 57 will continue until the error signal E reaches zero when the angular position of the crankshaft 13 and sprocket 15 is advanced to the desired relative angular position at which time the signals D and C are equal.

I claim:

1. A device for angularly displacing a camshaft relative to the crankshaft of an IC engine to vary the engine valve timing, comprising; a hub member; means to attach the hub member to the engine camshaft;
   a drive member rotatably mounted on said hub member, and means connecting said drive member in driving relationship with the engine crankshaft;
   an advancing member;
   a first means interconnecting said advancing member with said hub member affecting limited axial movement of the advancing member relative to said hub member;
   a second means interconnecting said advancing member with said drive member which upon axial movement of said advancing member causes limited rotation of said drive member relative to said hub member;
   an annular means mounted on said hub member, said advancing member mounted on said annular means;
   coacting meshing means formed in part on said annular means for moving said advancing member axially relative to said hub upon limited rotation of said annular means relative to the hub, and;
   a non-rotational retarder means which when actuated applies a retarding torque to said annular means causing limited rotation of said annular means relative to said hub and thus cause the advancing member to move axially of the hub whereby the drive member is moved a limited angular distance relative to the hub member.

2. A device as claimed in claim 1, including means for controlling the actuation of said retarder means so that said retarder means applies a predetermined amount of retarding torque to said annular means to cause said advancing member to move axially a predetermined axial distance and thus angularly displaces the camshaft relative to the drive shaft a predetermined member of degrees.

3. A device as claimed in claim 1 in which means are provided which permit rotation of said annular means relative to said hub but prevent axial movement of said annular means.

4. A device as claimed in claim 1 in which said retarder means has an annular working surface movable axially toward an opposed working surface on said annular means and means for causing the working surface of said retarder to move toward the opposed working surface on said annular means.

5. A device as claimed in claim 4 in which a fluid is disposed between said opposed working surfaces which through viscous shear of said fluid applies said retarding torque to said annular means.

6. A device as claimed in claim 4 in which said opposed working surfaces frictionally engage each other when said retarder means is actuated.

7. A device as claimed in claim 1 in which said first means includes a plurality of circumferencially spaced axially extending lugs attached to said hub member which coact with correspondingly positioned slots located in said advancing member.

8. A device as claimed in claim 7 in which said hub member includes a radially extending portion connecting an annular flange to said hub member, said lugs being attached to said flange and said slots formed in the outer periphery of said advancing member.

9. A device as claimed in claim 1 in which said second means includes a plurality or circumferentially spaced angled lugs attached to said drive member which coact with corresponding angled slots located in said advancing member.

10. A device as claimed in claim 9 in which said angled lugs are attached to a flange extending axially from said drive member.

11. A device as claimed in claim 9 in which said advancing member includes axially extending slots coacting with axially extending lugs attached to said hub.

12. A device as claimed in claim 11 in which said slots in said advancing member are formed in the outer periphery thereof.

13. A device as claimed in claim 1 in which said coacting meshing means include meshings threads formed in a cylindrical portion of said hub and in the internal diameter of said annular means.

14. A device as claimed in claim 13 in which said cylindrical portion of said hub member has an axial length substantially less than the diameter of the camshaft to which it is attached.

15. A device as claimed in claim 1 in which said retarder is actuated by an electrical coil which when energized creates electromagnetic forces causing the retarder means to apply a retarding force to said annular means.

16. A device as claimed in claim 15 in which said retarder is prevented from rotation by at least one flexible tab extending radially from the retarder and terminating in an end fixed to the engine head.

17. A device as claimed in claim 15 in which means are provided for securing said retarder from rotation relative to the engine head.

18. A device as claimed in claim 17 in which said securing means includes fastener means securing said retarder to a cover for said drive member.

19. A device as claimed in claim 15 in which said coil is energized by an error signal generated by a closed loop feedback circuit, means for sensing and generating a signal indicative of the actual angular position of the crankshaft relative to the drive member means for generating a signal indicative of the desired angular position thereof, and a comparator for receiving said signals and generating said error signal.

20. A device as claimed in claim 3 in which said coacting meshing means includes meshing threads formed on an external surface of said annular means and an internal surface of said advancing member.

21. A device as claimed in claim 15 in which said coacting meshing means includes meshing threads formed on an external surface of said annular means and an internal surface of said advancing member.

22. A device as claimed in claim 21 in which said annular means is substantially U-shaped in cross-section and said coil is disposed in an annular cavity of said annular means.

23. A device as claimed in claim 22 in which said annular cavity includes a closed end positioned adjacent the radially extending portion of said hub.

* * * * *